United States Patent [19]

Bose

[11] 4,282,605
[45] Aug. 4, 1981

[54] SOUND REPRODUCING WITH REMOTE AMPLIFYING TRANSDUCER

[75] Inventor: Amar G. Bose, Wayland, Mass.

[73] Assignee: Bose Corporation, Framingham, Mass.

[21] Appl. No.: 82,300

[22] Filed: Oct. 5, 1979

[51] Int. Cl.³ .............................................. H04B 9/00
[52] U.S. Cl. ...................... 455/617; 179/1 B;
179/1 H; 179/1 VE; 455/612
[58] Field of Search ................... 179/1 VE, 1 B, 1 H;
455/612, 617, 41, 53

[56] References Cited

U.S. PATENT DOCUMENTS

| | | | |
|---|---|---|---|
| 2,275,610 | 3/1942 | Bucky | 455/53 |
| 2,908,766 | 10/1959 | Taylor | 179/1 VE |
| 3,610,933 | 10/1971 | Shaver | 455/617 |
| 3,783,195 | 1/1974 | Day | 179/1 H |
| 4,012,633 | 3/1977 | Huntley | 455/612 |
| 4,186,273 | 1/1980 | Dodson | 179/1 VE |

FOREIGN PATENT DOCUMENTS 2021214 11/1971 Fed. Rep. of Germany ....... 179/1 VE

*Primary Examiner*—Howard Britton
*Attorney, Agent, or Firm*—Charles Hieken

[57] ABSTRACT

A vehicle sound system has a power amplifier integrated with a loudspeaker at each of four remote locations. An LED or diode laser transduces an electrical signal from a tuner or tape player at low level into a corresponding light signal that is transmitted over optical fibers to each remote location to a phototransistor that converts the light signal into a corresponding electrical signal that is amplified by the power amplifier and then reproduced by the loudspeakers. Leads from the vehicle battery carry D.C. power to each location for energizing the power amplifiers and phototransistors.

7 Claims, 2 Drawing Figures

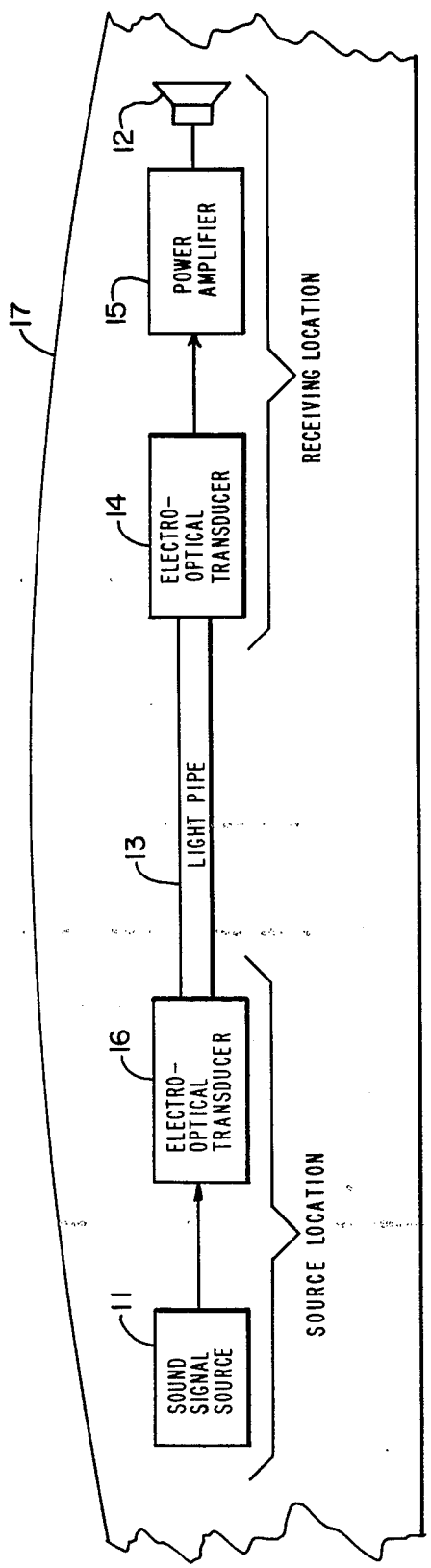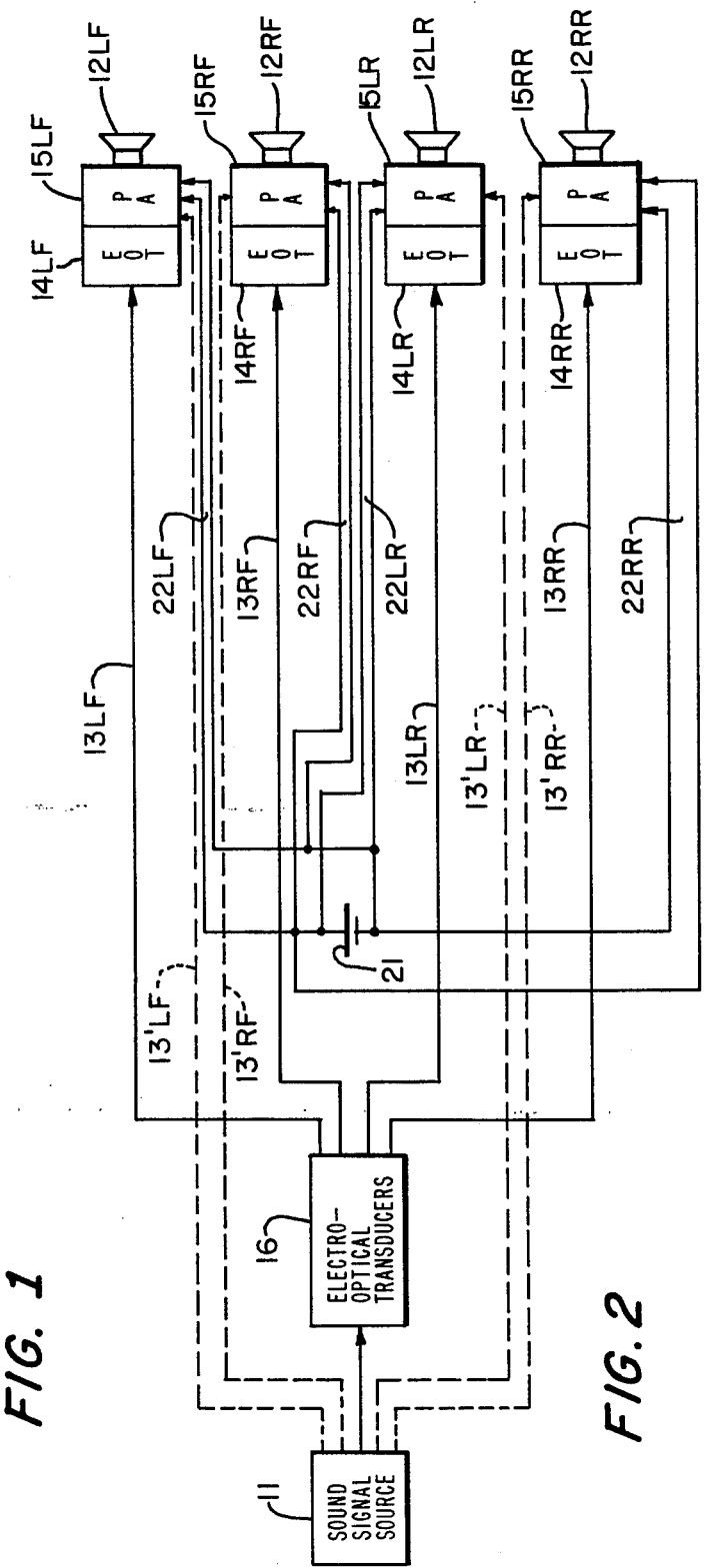

SOUND REPRODUCING WITH REMOTE AMPLIFYING TRANSDUCER

BACKGROUND OF THE INVENTION

The present invention relates in general to sound reproducing and more particularly concerns novel apparatus and techniques for reproducing sound in vehicles at high sound levels while being relatively insensitive to noise. The invention facilitates faithfully transmitting sound signals to remote loudspeakers with apparatus that is relatively inexpensive, safe and reliable.

High fidelity sound systems for vehicles have met with wide acceptance. These systems present problems because a vehicle is a source of significant electrical noise that may be reproduced by a power amplifier coupled to the sound source by conventional wires. Furthermore, large power amplifiers occupy useful vehicle space and require adequate ventilation of the heat produced.

Accordingly, it is an important object of this invention to provide an improved sound reproducing system.

It is a more specific object of the invention to provide an improved vehicle sound reproducing system in accordance with the preceding object.

It is a further object to achieve one or more of the preceding objects with a system that is relatively insensitive to the high levels of electrical noise developed in a vehicle.

It is still another object of the invention to achieve one or more of the preceding objects with reliable relatively inexpensive apparatus.

It is another object of the invention to achieve one or more of the preceding objects without using otherwise useful space for a power amplifier in a manner that facilitates ventilating power amplifiers.

SUMMARY OF THE INVENTION

According to the invention, there is a source of a low-level electrical sound signal representative of sound characterized thereby, source electro-optical transducing means responsive to the electrical sound signal for providing a corresponding sound light signal, receiving electro-optical transducing means responsive to said sound light signal for providing a corresponding received sound electrical signal, power amplifying means at the location of said receiving electro-optical transducing means remote from the location of said source and said source electro-optical transducing means for amplifying the received sound light signal, electro-acoustical transducing means at the location of said receiving electro-optical transducing means for converting the amplified sound signal into a corresponding sound signal, and light pipe means for intercoupling said source and receiving electro-optical transducing means.

According to a specific broad aspect of the invention, a number of remote loudspeaker driver means integrated with an associated power amplifying means are coupled to the low-level sound signal source and each power amplifying means receives D.C. power over leads connected to the vehicle D.C. power source.

Numerous other features, objects and advantages of the invention will become apparent from the following specification when read in connection with the accompanying drawing in which:

BRIEF DESCRIPTION OF THE DRAWING

FIG. 1 is a combined block-pictorial diagram of a system according to the invention, and FIG. 2 is a combined block-schematic diagram of a preferred system according to the invention.

DETAILED DESCRIPTION OF PREFERRED EMBODIMENTS

With reference now to the drawing and more particularly FIG. 1 thereof, there is shown a block-pictorial diagram of a system according to the invention. A sound signal from a sound signal source 11, such as a tuner or tape player, at a source location, typically near the dashboard of an automobile, is faithfully reproduced at a receiving location by loudspeaker 12, typically on a rear or front deck or in a door of an automobile. The source electro-optical transducer 16 at the source location receives the low-level sound signal from source 11 and converts it into a corresponding light signal that is delivered to light pipe 13. Light pipe 13 transmits the sound light signal to the receiving electro-optical transducer 14 at the receiving location for conversion into a corresponding electrical signal that is delivered to power amplifier 15. Power amplifier 15 amplifies this received sound signal and provides it at high power level to loudspeaker 12 that reproduces the sound represented by the signal from sound signal source 11.

The specific forms of electro-optical transducers are not a part of the invention. The electro-optical transducer 16 at the source location may comprise a light emitting diode that provides a light intensity representative of the contemporary magnitude of the sound signal provided by source 11. Light pipe 13 may comprise an optical fiber. Electro-optical transducer 14 may comprise a photodiode that provides an electrical signal representative of the incident light signal provided by light pipe 13. The light signal transmitted may be digital or analogue.

The invention is advantageous in helping prevent electrical noise from being transduced by loudspeaker 12. A vehicle is a source of electrical noises produced by the ignition system, flashers and other sources. A power amplifier near these noise sources or fed by conventional conductors near these sources may amplify this noise to produce annoying audible sounds.

An important feature of the invention is having the loudspeaker driver and power amplifier which drives it at the same location, preferably as an integrated package. This arrangement has a number of advantages. A larger single amplifier occupies more useful space and needs more ventilation then separate smaller power amplifiers integrated with associated drivers. For example, locating the amplifier under the dash restricts leg room and generates heat which may be trapped. If a single amplifier is placed in a remote location, such as in the trunk, useful trunk space may be occupied, the amplifier generates considerable heat, long leads carrying low-level signals must be run from the signal source in the dash to the remote amplifier, and heavy wires run from the amplifier to the loudspeaker drivers.

In contrast, with the feature of the present invention an amplifier having ¼ the power rating of a single amplifier may be located at each of four driver locations in a physical location that occupies no otherwise useful space, produces less heat to facilitate ventilation, and only need receive signal and d-c energizing power.

Referring to FIG. 2, there is shown a combined block-schematic representation of a preferred system according to the invention having four loudspeaker drivers 12LF, 12RF, 12LR and 12RR at the left front, right front, left rear and right rear of the vehicle, respectively, each integrated with a respective power amplifier (PA) 15LF, 15RF, 15LR and 15RR, respectively, and electro-optical transducer (EOT) 14LF, 14RF, 14LR and 14RR, respectively, coupled to source electro-optical transducers 16 by light pipes 13LF, 13RF, 13LR and 13RR, respectively. Each of the power amplifiers receives D.C. energizing potentials from a pair of wires connected to vehicle battery 21 over lead pairs 22LF, 22RF, 22LR and 22RR, respectively. While the light pipe electro-optical transducer arrangement is preferred, a number of the advantages enumerated above may be obtained by having electrical wires carry the signal from sound signal source 11 to the power amplifiers. These alternate signal paths are represented by the broken lines 13'LF, 13'RF, 13'LR and 13'RR coupling sound signal source 11 to power amplifiers 14LF, 14RF, 15LR and 15RR, respectively. These signal leads are preferably shielded twisted pairs to minimize picking up unwanted noise signals.

The advantages of this aspect of the invention will be better appreciated when it is recognized that the commercially available BOSE 1401 vehicle power amplifier, while exceptionally small, provides 100 watts for energizing four BOSE low impedance drivers. With the invention each of the power amplifiers 15LF, 15RF, 15LR and 15RR need only be 25 watts to provide the same sound intensity while providing less heat to dissipate and occupying less physical space, that physical space being essentially in the location occupied by the loudspeaker driver that is not otherwise useful space.

As still an alternative approach for transmitting the sound signal at low level to the remote power amplifiers, carrier current techniques may be used whereby the sound signal is modulated upon a carrier, preferably using frequency modulation on an R.F. carrier typically about 100 kHz, that is transmitted over the D.C. leads from battery 21, whereby appropriate R.F. chokes are used to keep one of the D.C. leads above ground. Each remote location then includes means for receiving the carrier and detecting the signal modulated thereon to provide the the received sound signal that is amplified by each power amplifier.

There has been described novel apparatus and techniques for reducing audible noise sounds in a vehicle sound reproducing system. It is apparent that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Vehicle sound reproducing apparatus comprising,
   a sound signal source for providing a sound electrical signal representative of sound at a source location in a vehicle,
   source electro-optical transducing means at said source location for transducing said sound electrical signal into a corresponding light signal,
   receiving electro-optical transducing means at a receiving location in said vehicle remote from said source location for converting a received light signal into a corresponding received sound electrical signal,
   power amplifying means for amplifying said received sound electrical signal to provide an amplified sound signal,
   electro-acoustical transducing means for transducing said amplified sound signal into a corresponding sound signal,
   and light pipe means for intercoupling said source and receiving electro-optical transducing means.

2. A vehicle sound system in accordance with claim 1 wherein said source electro-optical transducing means comprises a light emitting diode.

3. A vehicle sound reproducing system in accordance with claim 1 wherein said receiving electro-optical transducing means comprises a photocell.

4. A vehicle sound reproducing system in accordance with claim 2 wherein said receiving electro-optical transducing means comprises a photocell.

5. A vehicle sound reproducing apparatus in accordance with claim 1 wherein said light pipe means comprises an optical fiber.

6. Vehicle sound reproducing apparatus comprising,
   a source of an electrical sound signal representative of sound to be reproduced at a source location in a vehicle,
   a plurality of loudspeaker driver means for reproducing the sound represented by said electrical sound signal at a corresponding plurality of receiving locations in said vehicle remote from said source location,
   said vehicle having a D.C. source normally used by the vehicle electrical system,
   a plurality of power amplifying means each physically adjacent and coupled to a respective one of said loudspeaker driver means at the location thereof,
   means for coupling said sound electrical signal to each of said power amplifying means,
   and D.C. lead means for direct coupling D.C. power from said vehicle D.C. source to each of said power amplifying means.

7. Vehicle sound reproducing apparatus in accordance with claim 6 wherein said means for coupling comprises source electro-optical transducing means at the location of said source and a corresponding plurality of receiving electro-optical transducing means each integrated with a respective one of said power amplifying means,
   and a corresponding plurality of light pipe means for coupling said source electro-optical transducing means to a respective one of said receiving electro-optical transducing means.

* * * * *

REEXAMINATION CERTIFICATE (2777th)

United States Patent [19]

Bose

[11] B1 4,282,605

[45] Certificate Issued Jan. 23, 1996

[54] SOUND REPRODUCING WITH REMOTE AMPLIFYING TRANSDUCER

[75] Inventor: Amar G. Bose, Wayland, Mass.

[73] Assignee: Bose Corporation, Framingham, Mass.

Reexamination Request:
No. 90/002,546, Dec. 27, 1991

Reexamination Certificate for:
Patent No.: 4,282,605
Issued: Aug. 4, 1981
Appl. No.: 82,300
Filed: Oct. 5, 1979

[51] Int. Cl.$^6$ .................................................. H04B 10/00
[52] U.S. Cl. ............................................ 359/157; 381/77
[58] Field of Search ........................... 359/149, 150, 359/173, 151, 157

[56] References Cited

U.S. PATENT DOCUMENTS

| | | | |
|---|---|---|---|
| 4,015,115 | 3/1977 | Corcoran | 359/173 |
| 4,052,611 | 10/1977 | Fish . | |
| 4,135,202 | 1/1979 | Cutler | 358/86 |

FOREIGN PATENT DOCUMENTS

| | | |
|---|---|---|
| 2247032 | 5/1975 | France . |
| 51-5901 | 1/1976 | Japan . |
| 51-803 | 1/1976 | Japan . |
| 53-87213 | 8/1978 | Japan . |

OTHER PUBLICATIONS

Electronics, vol. 52, No. 10, pp. 39–40, May 10, 1979 Gosch, Light–Powered Phone Operates without an Internal Light Source.
Sinning, "The Application of Active Loudspeaker Boxes in Motor Cars," Journal: Grundig Tech. Inf., vol. 26 No. 1, 1979 (abstracted from German).

Primary Examiner—Leo Boudreau

[57] ABSTRACT

A vehicle sound system has a power amplifier integrated with a loudspeaker at each of four remote locations. An LED or diode laser transduces an electrical signal from a tuner or tape player at low level into a corresponding light signal that is transmitted over optical fibers to each remote location to a phototransistor that converts the light signal into a corresponding electrical signal that is amplified by the power amplifier and then reproduced by the loudspeakers. Leads from the vehicle battery carry D.C. power to each location for energizing the power amplifiers and phototransistors.

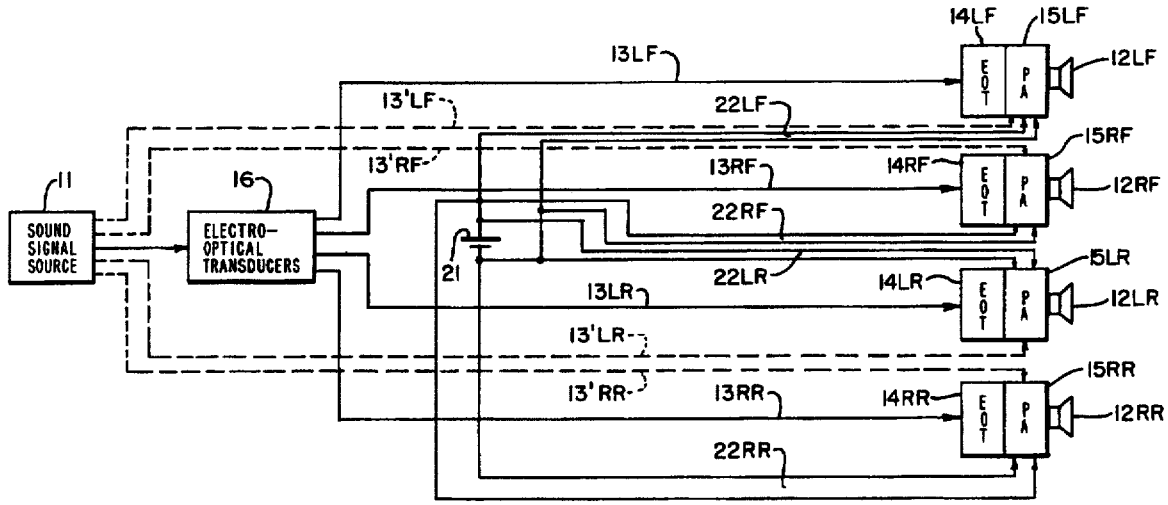

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claim 7 is confirmed.

Claim 6 was previously disclaimed.

Claims 1–5 are cancelled.

* * * * *